Patented Nov. 24, 1942

2,302,903

UNITED STATES PATENT OFFICE 2,302,903

PYRIDINE DICARBOXYLIC ACIDS

Kurt Westphal, Wuppertal-Vohwinkel, and Hans Andersag, Wuppertal-Elberfeld, Germany, assignors to Winthrop Chemical Company, Inc., New York, N. Y., a corporation of New York No Drawing. Application January 26, 1940, Serial No. 315,754. In Germany January 27, 1939

3 Claims. (Cl. 260—295)

This invention relates to pyridine dicarboxylic acids and to a process of preparing the same.

In accordance with the present invention 2-methyl-3-alkoxy-pyridine-4.5-dicarboxylic acids which are valuable starting materials in the manufacture of compounds of the type of vitamin B6 are obtainable by dehalogenating 1-halogen-3-methyl-4-alkoxy-isoquinolines, obtainable according to "Berichte der deutschen chemischen Gesellschaft" 33, page 992, nitrating the 3-methyl-4-alkoxy-isoquinolines thus obtainable by means of a usual nitrating agent, reducing the bz-nitro-3-methyl-4-alkoxy-isoquinolines thus formed to the corresponding amino compounds and oxidizing the bz-amino-3-methyl-4-alkoxy-isoquinolines to 2-methyl-3-alkoxy-pyradine-4.5-discarboxylic acids by an oxidizing agent. The alkoxy group in the starting materials may be for instance methoxy, ethoxy, isopropyloxy, etc. The dehalogenation advantageously is effected by treatment with a reducing agent, such as catalyzed hydrogen or zinc dust. The nitration may be carried out according to usual nitrating methods, for instance the nitrate of the base is introduced into oleum; the nitro compound is then converted into the corresponding amino compound by means of reduction methods known per se; the oxidation of the bz-amino-3-methyl-4-alkoxy-isoquinolines is preferably effected by means of an alkali metal permanganate in alkaline solution.

The invention is illustrated by the following example without, however, being restricted thereto:

Example 40 grams of 1-chloro-3-methyl-4-methoxy-isoquinoline are dissolved in a mixture of 600 ccs. of methanol and 100 ccs. of 2-normal sodium hydroxide solution and shaken with 20 grams of an 1% palladious chloride-calciumcarbonate-catalyzer in an hydrogen atmosphere until the quantity of hydrogen calculated has been taken up. The solution is filtered, the clear solution freed from methanol under reduced pressure and the oily residue is dissolved in dilute hydrochloric acid. The starting-material which remained undissolved is removed with ether, the hydrochloric solution made alkaline with potassium carbonate and shaken out with ether. After drying the ethereal solution and distilling off the ether the 3-methyl-4-methoxy-isoquinoline is obtained as an oil which boils under 2.5 mms. pressure at 115° C.

This substance is dissolved in alcohol and treated with concentrated nitric acid while cooling with ice until it reacts acid to Congo. The nitrate of the base thereupon precipitates which melts after filtering with suction and drying at 156° C. It is poured at 0° C. into the fourfold quantity of 20% oleum and remains in this solution for 12 hours at room temperature. Thereupon the mixture is poured on to ice, it is made slightly alkaline with potassium carbonate solution and extracted with methylene chloride. After the drying of the methylene chloride solution and evaporation of the solvent the crude nitro compound is obtained which soon solidifies. It is dissolved in the fourfold quantity of chlorobenzene and reduced with iron filings and dilute acetic acid while vividly boiling and stirring. The reaction mixture is thereupon extracted with methylene chloride and the extract dried by means of potassium carbonate. After evaporation of the solvent the 3-methyl-4-methoxy-aminoisoquinoline is obtained as an oil, which solidifies and is recrystallized from acetone-water up to the melting point of 118° C.

3.7 grams of this compound are dissolved in 3700 ccs. of water and 40 ccs. of 2-normal potassium hydroxide solution. 320 ccs. of 4% potassium permanganate solution are added drop by drop to the solution at 20° C. while stirring for 3 hours. After the addition of 50 ccs. of alcohol the solution is shortly boiled up and filtered while hot. The clear solution is concentrated under reduced pressure to 50 ccs. and extracted several times with ether. Thereupon the aqueous solution is made acid to Congo with concentrated hydrochloric acid and extracted for several days with ether. Crystals of the 2-methyl-3-methoxy-pyridine-4.5-dicarboxylic acid are precipitating from the ethereal solution soon which melt after recrystallization from water at 218° C. while foaming up.

The anhydride of the acid, which is obtained by a short boiling up of the acid with acetic anhydride, melts at 67° C.

We claim:

1. The process which comprises dehalogenating a 1-halogen-3-methyl-4-alkoxy-isoquinoline by a reducing agent selected from the group consisting of catalyzed hydrogen and zinc dust, nitrating the 3-methyl-4-alkoxy-isoquinoline obtained by a usual nitrating agent, converting the nitro compound formed into the corresponding amino compound by reduction and oxidizing the bz-amino-3-methyl-4-alkoxy-isoquinoline thus obtained to a 2-methyl-3-alkoxy-pyridine-4.5- dicarboxylic acid by treatment with alkali metal permanganate in the presence of alkali.

2. The process which comprises dehalogenating a 1-halogen-3-methyl-4-methoxy-isoquinoline by a reducing agent selected from the group consisting of catalyzed hydrogen and zinc dust, nitrating the 3-methyl-4-methoxy-isoquinoline obtained by a usual nitrating agent, converting the nitro compound formed into the corresponding amino compound by reduction and oxidizing the bz-amino-3-methyl-4-methoxy-isoquinoline thus obtained to a 2-methyl-3-methoxy-pyridine-4.5-dicarboxylic acid by treatment with alkali metal permanganate in the presence of alkali.

3. The process which comprises dehalogenating a 1-halogen-3-methyl-4-methoxy-isoquinoline by treatment with catalyzed hydrogen, introducing the nitrate of 3-methyl-4-methoxy-isoquinoline into excess 20% oleum, reducing the nitro compound formed with iron in chlorobenzene solution, and converting the 3-methyl-4-methoxy-bz-amino isoquinoline obtained into the 2-methyl-3-methoxy-pyridine-4.5-dicarboxylic acid by treatment with alkali metal permanganate in aqueous solution in the presence of alkali metal hydroxide.

KURT WESTPHAL.
HANS ANDERSAG.